US009527386B2

(12) United States Patent
Lee

(10) Patent No.: US 9,527,386 B2
(45) Date of Patent: Dec. 27, 2016

(54) CURVED DISPLAY APPARATUS AND METHOD FOR VEHICLE

(71) Applicant: Hyundai Motor Company, Seoul (KR)

(72) Inventor: Jong Bok Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 290 days.

(21) Appl. No.: 14/329,139

(22) Filed: Jul. 11, 2014

(65) Prior Publication Data

US 2015/0169077 A1 Jun. 18, 2015

(30) Foreign Application Priority Data

Dec. 18, 2013 (KR) .......................... 10-2013-0158189

(51) Int. Cl.
*G08B 5/00* (2006.01)
*B60K 35/00* (2006.01)
*B60K 37/06* (2006.01)
*G06F 3/02* (2006.01)

(52) U.S. Cl.
CPC .............. *B60K 35/00* (2013.01); *B60K 37/06* (2013.01); *G06F 3/0219* (2013.01); *B60K 2350/1008* (2013.01); *B60K 2350/1028* (2013.01); *B60K 2350/203* (2013.01); *B60K 2350/2052* (2013.01)

(58) Field of Classification Search
CPC ......................................................... G06F 3/02
USPC ...................................................... 340/815.4
See application file for complete search history.

(56) References Cited

U.S. PATENT DOCUMENTS

| 3,469,234 A * | 9/1969 | Edmund | ................ | B60K 37/00 340/435 |
| 2009/0151606 A1* | 6/2009 | Korber | ............... | A47B 21/0073 108/50.01 |
| 2010/0201893 A1* | 8/2010 | Pryor | ..................... | B60K 35/00 348/744 |
| 2010/0231547 A1* | 9/2010 | Pryor | ..................... | B60K 35/00 345/173 |

FOREIGN PATENT DOCUMENTS

| KR | 10-2004-0033494 A | 4/2004 |
| KR | 10-2011-0061378 A | 6/2011 |
| KR | 10-2012-0028726 A | 3/2012 |
| KR | 10-2012-0048220 A | 5/2012 |
| KR | 10-2013-0031050 A | 3/2013 |

* cited by examiner

*Primary Examiner* — Qutbuddin Ghulamali
(74) *Attorney, Agent, or Firm* — Mintz Levi Cohn Ferris Glovsky and Popeo, P.C.; Peter F. Corless

(57) ABSTRACT

A curved display apparatus and method for a vehicle are provided. The apparatus includes a projector disposed within a dashboard and configured to project an image onto a predetermined projection area. A first mirror reflects the image projected from the projector. A second mirror reflects the image reflected from the first mirror and a curved screen of the dashboard displays the image reflected from the second mirror. An infrared illuminator outputs infrared rays onto the curved screen and an infrared imaging device captures an infrared image of the curved screen. A physical button layer storage includes a housing and a physical button layer accommodated inside the housing and is drawn out to the front of the curved screen. A controller determines a touched position based on the infrared image and determines whether a pop-up condition is satisfied to draw out the physical button layer the front of the curved screen.

20 Claims, 7 Drawing Sheets

_US 9,527,386 B2_

CURVED DISPLAY APPARATUS AND METHOD FOR VEHICLE

CROSS-REFERENCE TO RELATED APPLICATION

This application claims priority to and the benefit of Korean Patent Application No. 10-2013-0158189 filed in the Korean Intellectual Property Office on Dec. 18, 2013, the entire contents of which are incorporated herein by reference.

BACKGROUND (a) Field of the Invention

The present invention relates to a curved display apparatus and method for a vehicle. More particularly, the present invention relates to a curved display apparatus for a vehicle that provides physical buttons.

(b) Description of the Related Art

A display apparatus has been developed from a cathode ray tube (CRT) that uses a cathode ray tube of the related art, and various display apparatus such as a liquid crystal display (LCD), a plasma display panel (PDP), an organic light emitting display (OLED), an electrowetting display (EWD), an electrophoretic display (EPD), an embedded microcavity display (EMD), and a nanocrystal display (NCD) have been developed.

Attempts have been made to apply a curved display apparatus to a cluster or an audio-video-navigation (AVN) system of a vehicle to improve an operating feel (or touch feel) for a user such as a driver and improve a vehicle design. In addition, a screen size of a display apparatus mounted within the vehicle has increased over the years. As a result, space required for installing physical buttons (e.g., button keys or a jog shuttle) has decreased.

The above information disclosed in this section is merely for enhancement of understanding of the background of the invention and therefore it may contain information that does not form the prior art that is already known in this country to a person of ordinary skill in the art.

SUMMARY

The present invention provides a curved display apparatus for a vehicle having advantages of drawing out a physical button layer when a pop-up condition is satisfied and the physical button layer is accommodated inside the housing.

A curved display apparatus for a vehicle according to an exemplary embodiment of the present invention may include: a projector disposed within a dashboard and configured to project an image onto a predetermined projection area; a first mirror configured to reflect the image projected from the projector; a second mirror configured to reflect the image reflected from the first mirror; a curved screen disposed on one surface of the dashboard and configured to display the image reflected from the second mirror; an infrared illuminator configured to output infrared rays onto the curved screen; an infrared imaging device (e.g., camera, video camera, or the like) configured to capture an infrared image of the curved screen; a physical button layer storage device including a housing and a physical button layer accommodated inside the housing and installed to be drawn out to the front of the curved screen; and a controller configured to determine the image displayed on the curved screen, operate the projector according to the determined image, and determine a touched position based on the infrared image, wherein the controller is configured to determine whether a pop-up condition is satisfied, and the physical button layer is drawn out to the front of the curved screen when the pop-up condition is satisfied.

The pop-up condition may be satisfied when a vehicle speed is greater than a first predetermined speed. In addition, the pop-up condition may be satisfied when a pop-up request signal is received from a user input unit. The controller may be configured to determine whether a pop-down condition is satisfied, and the physical button layer may be drawn into the housing when the pop-down condition is satisfied. The pop-down condition may be satisfied when a vehicle speed is less than a second predetermined speed. The pop-down condition may be satisfied when a pop-down signal is received from a user input unit. The first mirror may be an aspherical mirror manufactured based on a curvature value of the curved screen. The image displayed on the curved screen may include a user interface configured with a plurality of selectable objects.

The curved display apparatus may further include an application driver configured to execute an application function according to instructions from the controller. When the touched position corresponds to any one of the plurality of objects, the controller may be configured to generate instructions for operating an application function mapped (e.g., corresponding) to the selected object. At least one button and at least one knob may be provided on one surface of the physical button layer.

Further, the housing may include: a movement space in which a rack bar is slidably disposed; a receiving space in which the physical button layer is disposed; a guide space in which a guide groove is formed; and a gear chamber in which a pinion gear engaged with the rack bar is disposed. One end of the guide groove may be rounded toward the curved screen. The physical button layer and the rack bar may be connected through a link, one end (e.g., a first end) of the link may be hinge-connected with the physical button layer through a first hinge pin and the other end (e.g., a second end) of the link may be hinge-connected with the rack bar through a second hinge pin, and the first hinge pin may move along the guide groove based on a movement of the rack bar. The gear chamber may be formed above the movement space.

According to an exemplary embodiment of the present invention, a sufficient space for physical buttons may be assured. In addition, when a user's touch is misrecognized (e.g., recognized incorrectly), an application function may be executed using a physical button. Further, it may be possible to prevent a driver's attention from diverting when a vehicle is traveling at substantially high speeds by using physical buttons.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present invention, and wherein.

DESCRIPTION OF SYMBOLS

Figure 1:
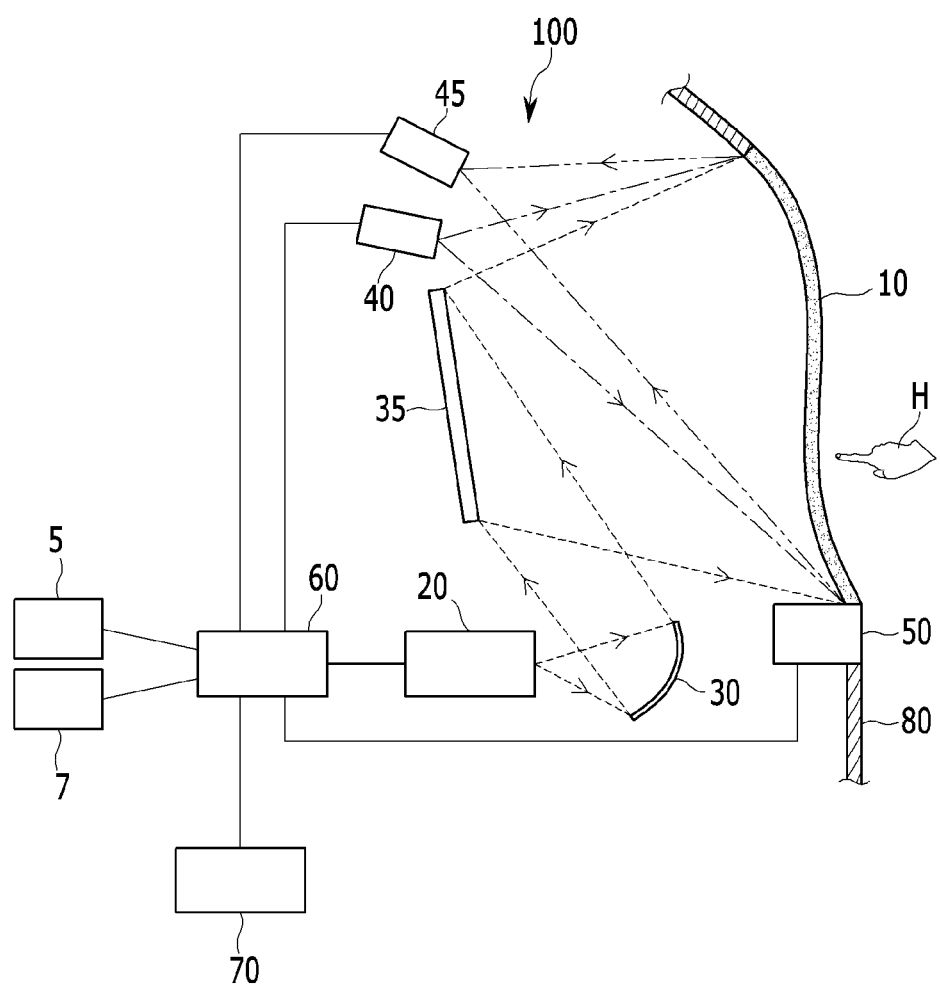
FIG. 1 is an exemplary schematic diagram of a curved display apparatus for a vehicle according to an exemplary embodiment of the present invention.

5: Data detector
7: User input unit
10: Curved screen
20: Projector
30: First mirror
35: Second mirror
40: Infrared illuminator
45: Infrared imaging device
50: Physical button layer storage device
60: Controller
70: Application driver
80: Dashboard
100: Curved display apparatus
510: Housing
512a: Movement space
512b: Receiving space
512c: Guide space
512d: Gear chamber
514: Guide groove
520: Physical button layer
530: Rack bar
535: Pinion gear
540: Link
542a: First hinge shaft
542b: Second hinge shaft
550: Drive motor

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. In addition, parts irrelevant to the description will be omitted to clearly describe the present invention, and the same elements will be designated by the same reference numerals throughout the specification. Further, since each component shown in the drawings is arbitrarily illustrated for ease of description, the present invention is not particularly limited to the components illustrated in the drawings.

Figure 2:
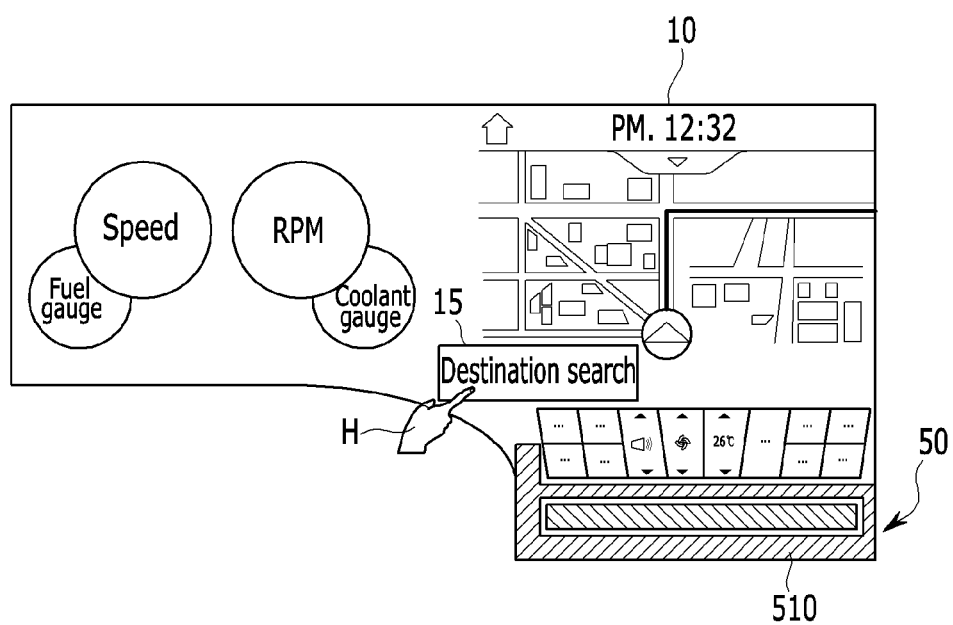
FIG. 2 is an exemplary drawing showing a case in which a physical button layer is accommodated inside a physical button layer storage device according to an exemplary embodiment of the present invention.
Figure 3A:
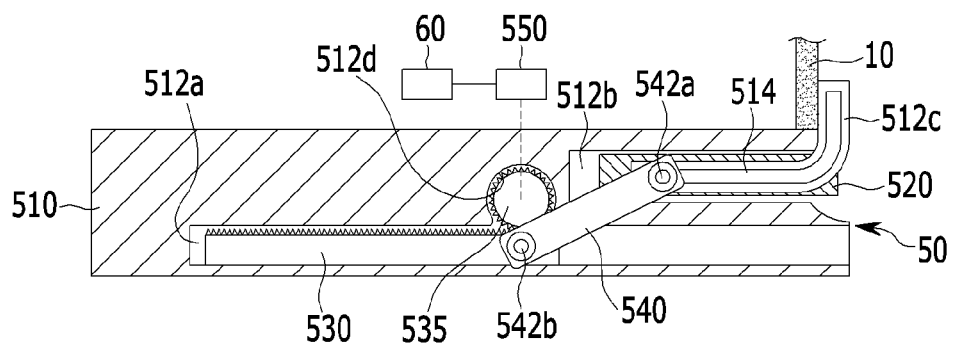
FIG. 3A to FIG. 3D are exemplary drawings showing an operation state of a physical button layer storage device according to an exemplary embodiment of the present invention.
Figure 3B:
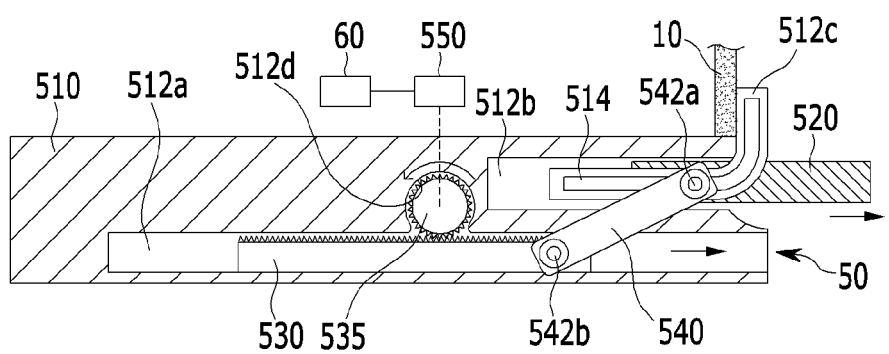
Figure 3C:
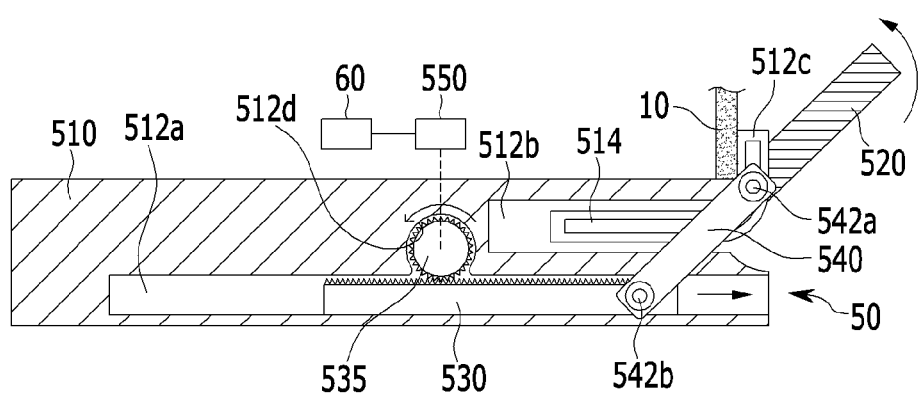
Figure 3D:
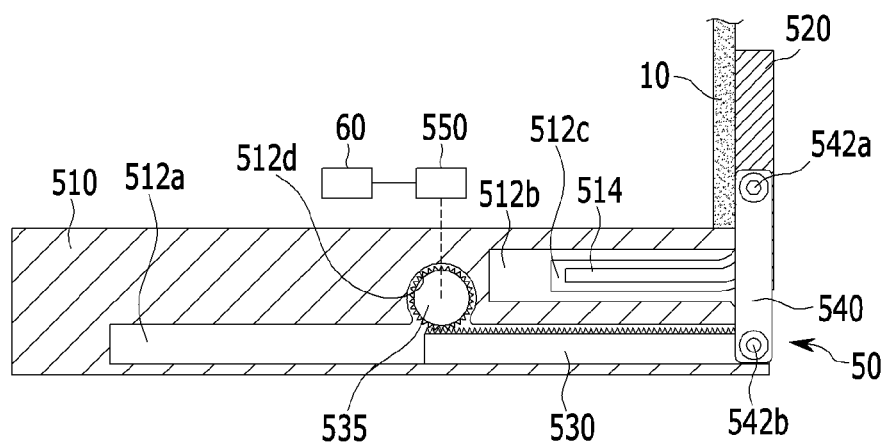

FIG. 1 is an exemplary schematic diagram of a curved display apparatus for a vehicle according to an exemplary embodiment of the present invention. FIG. 2 is an exemplary drawing showing a case in which a physical button layer is accommodated in a physical button layer chamber according to an exemplary embodiment of the present invention. As shown in FIG. 1 and FIG. 2, a curved display apparatus 100 for a vehicle according to an exemplary embodiment of the present invention may include a curved screen 10, a projector 20, a first mirror 30, a second mirror 35, an infrared illuminator 40, an infrared imaging device 45, a physical button layer storage device 50, and a controller 60. The controller 60 may be configured to operate the curved screen 10, the projector 20, the first mirror 30, the second mirror 35, the infrared illuminator 40, the infrared imaging device 45, and the physical button layer storage device 50.

The curved screen 10 may be disposed on one surface of a dashboard 80 and be made of a transparent acryl material to display an image. The projector 20 may be within the dashboard 80 and configured to project the image to a predetermined projection area. The image may be displayed on the curved screen 10 to allow a viewer such as a driver to visually recognize the image. The controller 60 may be configured to determine an image to be displayed on the curved screen 10, and operate the projector 20 according to the determined image. The controller 60 may also be configured to determine the image based on traveling information detected from an information detector 5 (e.g., data detector).

The image may include cluster information, navigation information, audio information, air conditioning information, and the like. The cluster information may include vehicle speed information, engine speed information, coolant temperature information, fuel level information, accumulated distance information, traveled distance information, operating state information of lamps (e.g., turn signal lamps or high beam lamps), operating state information of devices (e.g., doors, seat belts, or battery), and the like.

The navigation information, audio information, and air conditioning information may include a user interface configured with a plurality of selectable objects that correspond various buttons and screens for operating a navigation device, an audio device, and an air conditioner. In particular, an object refers to information selected and operated by an intention of a user. For example, the object may be an image, an icon, a folder icon, text, content, a list, and the like. The navigation information may include a navigation menu configured with a plurality of selectable objects, a present position of the vehicle, route guidance on a map, and the like. The audio information may include an audio menu configured with a plurality of selectable objects, volume, a sound source being currently played, a radio channel frequency, and the like. The air conditioner information may include an air conditioning menu, current temperature, amount of airflow, and the like.

The first mirror 30 and the second mirror 35 may be disposed between the curved screen 10 and the projector 20. The image projected from the projector 20 may be reflected to the second mirror 35 via the first mirror 30. The image reflected from the second mirror 35 may be projected to the curved screen 10 and then displayed to the user. The first mirror 30 may be an aspherical mirror manufactured based on the curvature value of the curved screen 10. In addition, by using the first mirror 30, the path depth of light required for displaying the image on the curved screen 10 may be adjusted to reduce the size of the curved display apparatus 100.

In addition, to detect a touch input of the user, the infrared illuminator 40 and the infrared imaging device 45 may be used. The infrared illuminator 40 may be configured to output infrared rays to the curved screen 10. The infrared imaging device 45 (e.g., a camera, a video camera, or the like) may be configured to capture an infrared image that corresponds to the substantially entire area of the curved screen 10. The infrared imaging device 45 may be configured to process an image frame such as a still image or a motion picture obtained by an image sensor in a capture mode. The processed image frame may be transmitted to the controller 60. The controller 60 may be implemented with one or more microprocessors executed by a predetermined program. The predetermined program may include a series of commands for performing each step included in a method for controlling the curved display apparatus 100 according to an exemplary embodiment of the present invention.

The curved display apparatus 100 according to an exemplary embodiment of the present invention may further include an application driver 70 configured to execute an application function according to operation instructions of the controller 60. When a user's hand H touches any point on the curved screen 10 (e.g., in response to detecting a touch), the infrared imaging device 45 may be configured to capture the infrared image reflected from the curved screen 10. The controller 60 may be configured to determine a touch point based on the reflected infrared image. The user may select a desired object among the plurality of objects. In this instance, the controller 60 may be configured to generate control instructions to operate an application function mapped to (e.g., corresponding to) the selected object, and output the control instructions to the application driver 70. That is, the controller 60 may be configured to determine a corresponding function based on the selected object. In particular, the application function may be one of various application functions of a plurality of electronic devices (e.g., the navigation device, the audio device, or the air conditioner) disposed within the vehicle.

Referring to FIG. 2, when a user's hand (H) touches a desired object 15 (e.g., in response to detecting pressure on the display), the controller 60 may be configured to generate control instructions to operate a "destination search" function mapped to the selected object 15 and output the control instructions to the application driver 70. As a result, the navigation device may be configured to execute the "destination search" function. The physical button layer storage device 50 may be installed within the dashboard 80. The physical button layer storage device 50 may include a housing 510 and a physical button layer 520 accommodated inside the housing 510 and installed to be drawn out to the front of the curved screen 10. In other words, the physical buttons and knobs of the physical button layer 520 may be ejected out of the front of the curved screen 10 to allow a user to physically adjust the buttons and knobs to perform various functions.

Figure 4:
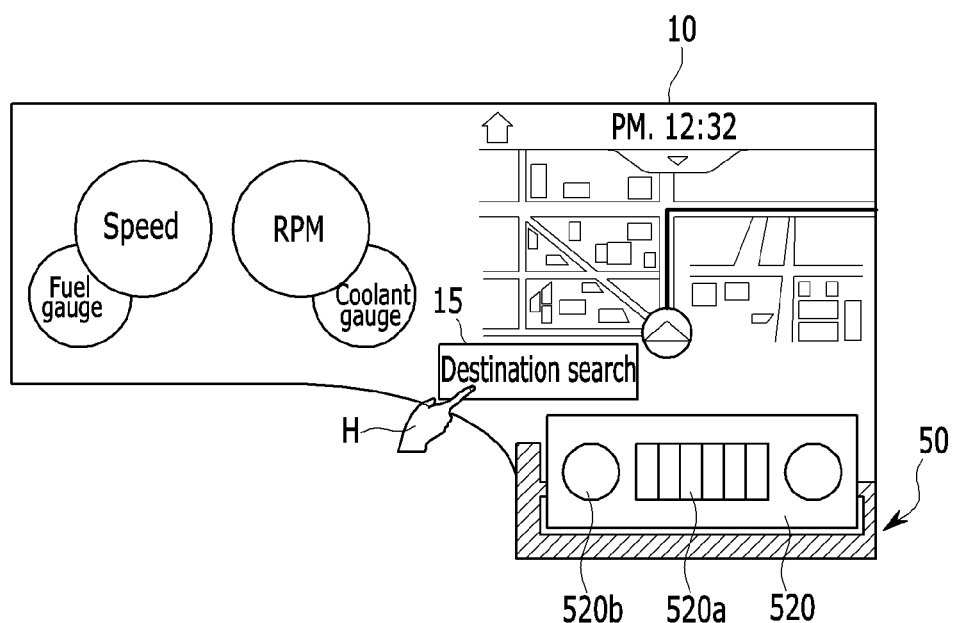
FIG. 4 is an exemplary drawing showing a case in which a physical button layer is drawn out from a physical button layer storage device according to an exemplary embodiment of the present invention.

FIG. 3A to FIG. 3D are exemplary drawings showing an operation state of a physical button layer storage device according to an exemplary embodiment of the present invention. FIG. 4 is an exemplary drawing showing a case in which a physical button layer is drawn out (e.g., ejected from, protrudes from, etc.) from a physical button layer storage device according to an exemplary embodiment of the present invention. The physical button layer storage device 50 shown in FIG. 3A to FIG. 3D is merely an example for describing the exemplary embodiment of the present invention, and the present invention is not limited thereto. Even in a different configuration from the physical button layer storage device 50, the technical spirit of the present invention may be applied to any configuration which may substantially draw out the physical button layer 520.

Furthermore, a movement space 512a, a receiving space 512b, a guide space 512c, and a gear chamber 512d may be formed in the housing 510. A rack bar 530 may be slidably disposed in the movement space 512a. A pinion gear 535 may be engaged with the rack bar 530. The pinion gear 535 may be mounted in a rotation shaft of a drive motor 550, and the rack bar 530 may slide forward or backward according to a rotation of the pinion gear 535. The pinion gear 535 may be disposed inside the gear chamber 512d, and the gear chamber 512d formed above the movement space 512a.

In addition, the physical button layer 520 may be disposed in the receiving space 512b. At least one button 520a and at least one knob 520b may be provided on one surface of the physical button layer 520. In particular, one end (e.g., a first end) of the receiving space 512b may be opened and the other end (e.g., a second end) of the receiving space 512b may be closed. An opened portion of the receiving space 512b may be rounded away from the curved screen 10. Additionally, a guide groove 514 may be formed in the guide space 512c and one end (e.g., a first end) of the guide space 512c may be rounded toward the curved screen 10. The physical button layer 520 and the rack bar 530 may be connected through a link 540. One end (e.g., a first end) of the link 540 may be hinge-connected with the physical button layer 520 through a first hinge pin 542*a* and the other end (e.g., a second end) of the link 540 may be hinge-connected (e.g., connected via a hinge) with the rack bar 530 through a second hinge pin 542*b*.

The rack bar 530 may be configured to move forward when the pinion gear 535 is rotated in a counterclockwise direction by the drive motor 540 according to a drive signal of the controller 60. The first hinge pin 542*a* may be configured to move along the guide groove 514 when the rack bar 530 moves forward. As a result, the physical button layer 520 may be drawn out (e.g., may be pushed out, may move forward, etc.) to the front of the curved screen 10 and the user may operate the button 520*a* disposed on the physical button layer 520. In addition, the rack bar 530 may be configured to move backward when the pinion gear 535 is rotated in a clockwise direction by the drive motor 540 according to a drive signal of the controller 60. The first hinge pin 542*a* may be configured to move along the guide groove 514 when the rack bar 530 moves backward. As a result, the physical button layer 520 may be drawn into the housing 510 (e.g., may be retracted into the housing).

The controller 60 may be configured to determine whether a pop-up condition is satisfied, and physical button layer 520 may be drawn out to the front of the curved screen 10 when the pop-up condition is satisfied. The pop-up condition may be satisfied when a vehicle speed is greater than a first predetermined speed. The controller 60 may be configured to compare a vehicle speed with the first predetermined speed based on traveling information detected by the information detector 5. The first predetermined speed may be arbitrarily set by a person of ordinary skill in the art, and may be about 60 km/h. In other words, it may be possible to prevent a driver's attention from diverting when the vehicle is traveling at substantially high speeds (e.g., speeds above a predetermined speed limit).

In addition, the pop-up condition may be satisfied when a pop-up request signal is received from a user input unit 7. The user input unit 7 may be configured to generate input data for drawing out the physical button layer 520 according to an input of the user. The user input unit 7 may be configured with a button or an object displayed on the curved screen 10. The controller 60 may be configured to determine whether a pop-down condition is satisfied, and the physical button layer 520 may be drawn into the housing 510 (e.g., retracted) when the pop-down condition is satisfied.

The pop-down condition may be satisfied when the vehicle speed is less than a second predetermined speed. The controller 60 may be configured to compare the vehicle speed with the second predetermined speed based on traveling information detected by the information detector 5. The second predetermined speed may be arbitrarily set by a person of ordinary skill in the art considering the first vehicle speed. Predetermined hysteresis may be set to prevent chattering in a boundary region between the first predetermined vehicle and the second predetermined speed. In other words, the second predetermined speed may be less than the first predetermined speed. In addition, the pop-down condition may be satisfied when a pop-down request signal is received from the user input unit 7.

As describe above, according to an exemplary embodiment of the present invention, sufficient space for physical buttons may be assured. In addition, when user's touch is misrecognized, an application function may be executed using a physical button. That is, a corresponding function may still be executed when a pressure on a display screen is misrecognized by allowing user input via physical buttons and knobs. Accordingly, the vehicle may provide both a display screen and physical buttons and knobs, thus increasing user convenience. Further, it may be possible to prevent a driver's attention from diverting when a vehicle is traveling at substantially high speeds by using physical buttons.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the accompanying claims.

What is claimed is:

1. A curved display apparatus for a vehicle, comprising:
    a projector disposed within a dashboard and configured to project an image onto a predetermined projection area;
    a first mirror configured to reflect the image projected from the projector;
    a second mirror configured to reflect the image reflected from the first mirror;
    a curved screen disposed on one surface of the dashboard and configured to display the image reflected from the second mirror;
    an infrared illuminator configured to output infrared rays onto the curved screen;
    an infrared imaging device configured to capture an infrared image of the curved screen;
    a physical button layer storage device including a housing and a physical button layer accommodated inside the housing and installed to be drawn out to the front of the curved screen; and
    a controller configured to:
        determine the image displayed on the curved screen;
        operate the projector according to the determined image;
        determine a touched position based on the infrared image,
        determine whether a pop-up condition is satisfied; and
        draw out the physical button layer to the front of the curved screen when the pop-up condition is satisfied.

2. The curved display apparatus of claim 1, wherein the pop-up condition is satisfied when a vehicle speed is greater than a first predetermined speed.

3. The curved display apparatus of claim 1, wherein the pop-up condition is satisfied when a pop-up request signal is received from a user input unit.

4. The curved display apparatus of claim 1, wherein the controller is configured to determine whether a pop-down condition is satisfied, and retract the physical button layer into the housing when the pop-down condition is satisfied.

5. The curved display apparatus of claim 4, wherein the pop-down condition is satisfied when a vehicle speed is less than a second predetermined speed.

6. The curved display apparatus of claim 4, wherein the pop-down condition is satisfied when a pop-down request signal is received from a user input unit.

7. The curved display apparatus of claim 1, wherein the first mirror is an aspherical mirror manufactured based on a curvature value of the curved screen.

8. The curved display apparatus of claim 1, wherein the image displayed on the curved screen includes a user interface configured with a plurality of selectable objects.

9. The curved display apparatus of claim 8, wherein the controller is further configured to:
    generate control instructions for operating an application function mapped to a selected object in response to determining that the touched position corresponds to any one of the plurality of objects.

10. The curved display apparatus of claim 1, wherein at least one button and at least one knob are disposed on one surface of the physical button layer.

11. The curved display apparatus of claim 1, wherein the housing includes:
   a movement space in which a rack bar is slidably disposed;
   a receiving space in which the physical button layer is disposed;
   a guide space in which a guide groove is formed; and
   a gear chamber in which a pinion gear engaged with the rack bar is disposed,
   wherein one end of the guide space is rounded toward the curved screen.

12. The curved display apparatus of claim 11, wherein
   the physical button layer and the rack bar are connected through a link,
   a first end of the link is hinge-connected with the physical button layer through a first hinge pin and a second end of the link is hinge-connected with the rack bar through a second hinge pin, and
   the first hinge pin moves along the guide groove according to a movement of the rack bar.

13. The curved display apparatus of claim 11, wherein the gear chamber is formed above the movement space.

14. A curved display method for a vehicle, comprising:
   projecting, by a controller, an image onto a predetermined projection area using a projector disposed within a dashboard;
   displaying, by the controller, the image projected from the projector on a curved screen disposed on one surface of the dashboard;
   outputting, by the controller, infrared rays onto the curved screen;
   capturing, by the controller, an infrared image of the curved screen using an infrared imaging device;
   determining, by the controller, a touched position based on the infrared image,
   determining, by the controller, whether a pop-up condition is satisfied; and
   drawing out, by the controller, a physical button layer to the front of the curved screen when the pop-up condition is satisfied.

15. The method of claim 14, wherein the pop-up condition is satisfied when a vehicle speed is greater than a first predetermined speed.

16. The method of claim 14, further comprising:
   determining, by the controller, whether a pop-down condition is satisfied; and
   retracting, by the controller, the physical button layer into the housing when the pop-down condition is satisfied.

17. The method of claim 16, wherein the pop-down condition is satisfied when a vehicle speed is less than a second predetermined speed.

18. A non-transitory computer readable medium containing program instructions executed by a controller, the non-transitory computer readable medium comprising:
   program instructions that project an image onto a predetermined projection area using a projector disposed within a dashboard;
   program instructions that display the image projected from the projector on a curved screen disposed on one surface of the dashboard;
   program instructions that output infrared rays onto the curved screen;
   program instructions that capture an infrared image of the curved screen using an infrared imaging device;
   program instructions that determine a touched position based on the infrared image,
   program instructions that determine whether a pop-up condition is satisfied; and
   program instructions that draw out a physical button layer to the front of the curved screen when the pop-up condition is satisfied.

19. The non-transitory computer readable medium of claim 18, wherein the pop-up condition is satisfied when a vehicle speed is greater than a first predetermined speed.

20. The non-transitory computer readable medium of claim 18, further comprising:
   program instructions that determine whether a pop-down condition is satisfied; and
   program instructions that retract the physical button layer into the housing when the pop-down condition is satisfied.

* * * * *